(12) United States Patent
Trelin

(10) Patent No.: US 11,379,841 B2
(45) Date of Patent: Jul. 5, 2022

(54) BIOMETRIC PRE-IDENTIFICATION

(71) Applicant: Alclear, LLC, New York, NY (US)

(72) Inventor: Joe Trelin, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

(21) Appl. No.: 17/144,918

(22) Filed: Jan. 8, 2021

(65) Prior Publication Data

US 2021/0125188 A1 Apr. 29, 2021

Related U.S. Application Data

(63) Continuation of application No. 16/048,057, filed on Jul. 27, 2018, now Pat. No. 10,922,691.

(Continued)

(51) Int. Cl.

| | |
|---|---|
| *G06Q 20/40* | (2012.01) |
| *G06F 21/32* | (2013.01) |
| *G07C 9/00* | (2020.01) |
| *B60R 25/25* | (2013.01) |
| *B66B 1/34* | (2006.01) |
| *G07C 9/37* | (2020.01) |
| *G06V 20/59* | (2022.01) |
| *G06V 40/16* | (2022.01) |
| *B60R 16/037* | (2006.01) |
| *B60W 40/08* | (2012.01) |

(Continued)

(52) U.S. Cl.
CPC ..... *G06Q 20/40145* (2013.01); *B60R 16/037* (2013.01); *B60R 25/25* (2013.01); *B60W 40/08* (2013.01); *B66B 1/3407* (2013.01); *G06F 21/32* (2013.01); *G06V 20/597* (2022.01); *G06V 40/173* (2022.01); *G07C 9/00* (2013.01); *G07C 9/37* (2020.01); *B60W 2040/0809* (2013.01); *B60W 2040/0827* (2013.01); *B60W 2040/0872* (2013.01); *B66B 2201/4676* (2013.01); *G06V 40/12* (2022.01); *G06V 40/197* (2022.01); *G07C 9/257* (2020.01)

(58) Field of Classification Search
CPC ............. G06F 21/32; B66B 1/3407; B66B 2201/4676; G07C 9/00079; G07C 9/00158; G07C 9/37; G06Q 20/40145; B60R 25/25; B60W 40/08

See application file for complete search history.

(56) References Cited

U.S. PATENT DOCUMENTS

| | | |
|---|---|---|
| 6,999,936 B2 | 2/2006 | Sehr et al. |
| 7,239,723 B1 * | 7/2007 | Al-Sheikh ............ B42D 25/309 382/118 |

(Continued)

*Primary Examiner* — Thomas D Alunkal
(74) *Attorney, Agent, or Firm* — Brownstein Hyatt Farber Schreck, LLP

(57) ABSTRACT

A station device in a biometric pre-identification system uses identity to perform one or more actions. Identities are determined (such as via a backend) using biometric information. A biometric pre-identification device obtains biometric information and/or a digital representation thereof from a person approaching the station device. The biometric pre-identification device transmits such to the station device, facilitating the station to begin and/or perform various actions. The station device begins or performs the actions using the identity determined based on the biometric information before the person arrives at the station device.

20 Claims, 14 Drawing Sheets

Related U.S. Application Data

(60) Provisional application No. 62/538,418, filed on Jul. 28, 2017, provisional application No. 62/545,511, filed on Aug. 15, 2017, provisional application No. 62/550,179, filed on Aug. 25, 2017.

(51) Int. Cl.
   *G07C 9/25* (2020.01)
   *G06V 40/12* (2022.01)
   *G06V 40/18* (2022.01)

(56) References Cited

U.S. PATENT DOCUMENTS

| | | |
|---|---|---|
| 8,255,697 B2 | 8/2012 | Mathiassen et al. |
| 8,381,969 B1 | 2/2013 | Miller et al. |
| 8,423,462 B1 | 4/2013 | Amacker et al. |
| 8,521,131 B1 | 8/2013 | Ramalingam et al. |
| 8,744,966 B1 | 6/2014 | Amacker et al. |
| 8,965,170 B1 | 2/2015 | Benea |
| 9,055,337 B2 | 6/2015 | Elliott et al. |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,324,098 B1 | 4/2016 | Agrawal et al. |
| 9,386,507 B1 | 7/2016 | Ramalingam et al. |
| 9,607,138 B1 | 3/2017 | Baldwin et al. |
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,723,131 B1 | 8/2017 | Ramalingam et al. |
| 9,773,161 B2 | 9/2017 | Kephart et al. |
| 9,836,642 B1 | 12/2017 | Ramaswamy |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 11,151,481 B1 | 10/2021 | Sun et al. |
| 2002/0034319 A1 | 3/2002 | Turney |
| 2004/0221303 A1 | 11/2004 | Sie |
| 2005/0063566 A1* | 3/2005 | Beek .................. H04N 7/186 348/E7.086 |
| 2006/0028556 A1 | 2/2006 | Bunn et al. |
| 2009/0192833 A1 | 7/2009 | Mersky et al. |
| 2010/0262649 A1* | 10/2010 | Fusz .................. G06Q 30/02 709/203 |
| 2010/0332648 A1* | 12/2010 | Bohus ................ G06Q 10/10 709/224 |
| 2011/0191840 A1* | 8/2011 | Ortiz .................. H04L 63/0861 726/7 |
| 2013/0151267 A1* | 6/2013 | Mehdizadeh ........ G16H 20/13 705/2 |
| 2013/0160141 A1* | 6/2013 | Tseng .................. G06F 21/31 726/28 |
| 2013/0211669 A1* | 8/2013 | DePetro ............... B60N 2/002 701/1 |
| 2013/0279757 A1 | 10/2013 | Kephart et al. |
| 2014/0063191 A1* | 3/2014 | Bataller .............. H04N 13/275 340/541 |
| 2014/0189720 A1 | 7/2014 | Terrazas |
| 2015/0294515 A1 | 10/2015 | Bergdale |
| 2016/0110591 A1* | 4/2016 | Smith ................ G06V 20/52 382/103 |
| 2016/0167920 A1* | 6/2016 | Freeman ............ B66B 1/2458 187/384 |
| 2016/0189063 A1 | 6/2016 | Nie |
| 2016/0371535 A1 | 12/2016 | Li et al. |
| 2017/0188103 A1 | 6/2017 | Pan |
| 2018/0007060 A1 | 1/2018 | Leblang et al. |
| 2019/0036939 A1 | 1/2019 | Johansson et al. |
| 2019/0043281 A1 | 2/2019 | Aman et al. |
| 2019/0050631 A1 | 2/2019 | Hayase |

\* cited by examiner

BIOMETRIC PRE-IDENTIFICATION

CROSS-REFERENCE TO RELATED APPLICATION(S)

This application is a continuation patent application of U.S. patent application Ser. No. 16/048,057, filed Jul. 27, 2018 and titled "Biometric Pre-Identification," which is a nonprovisional patent application of and claims the benefit of U.S. Provisional Patent Application No. 62/545,511, filed Aug. 15, 2017 and titled "Biometric Pre-Identification," U.S. Provisional Patent Application No. 62/538,418, filed Jul. 28, 2017 and titled "Biometric Payment," and U.S. Provisional Patent Application No. 62/550,179, filed Aug. 25, 2017 and titled "Biometric Identification System Connected Vehicle," the disclosures of which are hereby incorporated herein by reference in their entireties.

FIELD

The described embodiments relate generally to biometrics. More particularly, the present embodiments relate to biometric pre-identification.

BACKGROUND

Biometric identification systems may identify people using biometrics. Biometrics may include fingerprints, irises, retinas, eyes, faces, voices, gaits, pictures, or other identifying characteristics about a person. A biometric identification system may capture a biometric using a biometric reader and identify a person by comparing the captured information against stored information. For example, a camera may capture an image of a fingerprint and compare the image of the fingerprint against stored fingerprint images.

SUMMARY

The present disclosure relates to biometric pre-identification. A station device may use identity to perform one or more actions. Identities may be determined (such as via a backend) using biometric information. A biometric pre-identification device may obtain biometric information and/or a digital representation thereof from a person approaching the station device. The biometric pre-identification device may transmit such to the station device, facilitating the station device to begin and/or perform various actions. The station device may begin or perform the actions using the identity determined based on the biometric information before the person arrives at the station device. In this way, the station device may be able to function faster and/or more efficiently as time for the actions after the person arrives at the station device may be decreased and/or eliminated. This technological solution may increase station device responsiveness, allow the station device to spread action performance across a wider time span without requiring the person to wait for action completion, and so on. This may also allow the station device to perform the function of having various actions completed upon the person's arrival as the station device was able to work on such actions prior to the person's arrival.

In various implementations, a system for biometric pre-identification includes a biometric pre-identification device that obtains a biometric for a person and a station device. The station device receives an identity of the person determined using the biometric and begins an action using the identity prior to arrival of the person at the station device.

In some examples, the system tracks the person between obtaining of the biometric and arrival of the person at the station device. In various examples, the biometric pre-identification device may be a biometric reader that is incorporated into or connected to the station device.

In numerous examples, the action involves determining permissions for the person. In some such examples, the action further includes preparing credentials to provide using the permissions. In various such examples, the action further includes preparing access for the person using the permissions. In various examples, the action involves determining a device configuration for the person and configuring a device using the device configuration.

In some implementations, a station device that uses identification in a biometric pre-identification system includes at least one non-transitory storage medium that stores instructions, a communication unit, and at least one processor. The at least one processor executes the instructions to receive an identity of a person via the communication unit, the identity determined using a biometric obtained by a biometric pre-identification device, and perform an action using the identity prior to arrival of the person at the station device.

In various examples, the action includes determining a reservation for the person and performing a task in fulfillment of the reservation. In some examples, the action includes operating an entry mechanism using the identity. In numerous examples, the action includes summoning an elevator and programming a floor for the elevator. In various examples, the action includes adjusting a light or a heating, ventilation, and air conditioning system.

In some examples, the action includes determining a task previously requested by the person and arranging for the task to be performed. In numerous examples, the action includes determining an entitlement for the person and arranging for the entitlement to be provided.

In numerous implementations, a biometric pre-identification device includes a biometric reader, at least one non-transitory storage medium that stores instructions, a communication unit, and at least one processor. The at least one processor executes the instructions to obtain a digital representation of a biometric via the biometric reader for a person approaching a station device that uses identification and facilitate the station device taking an action using an identity of the person by transmitting the digital representation of the biometric via the communication unit for determination of the identity.

In some examples, the digital representation of the biometric includes at least two different types of biometrics for the person. In various examples, the digital representation of the biometric is at least one of a gait of the person, a retina of the person, an iris of the person, or at least a portion of a face of the person. In numerous examples, the digital representation of the biometric includes an override action that signals to override performance of a particular action In various examples, the biometric pre-identification device tracks the person to the station device after the digital representation of the biometric is obtained. In some examples, the biometric reader is a camera.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
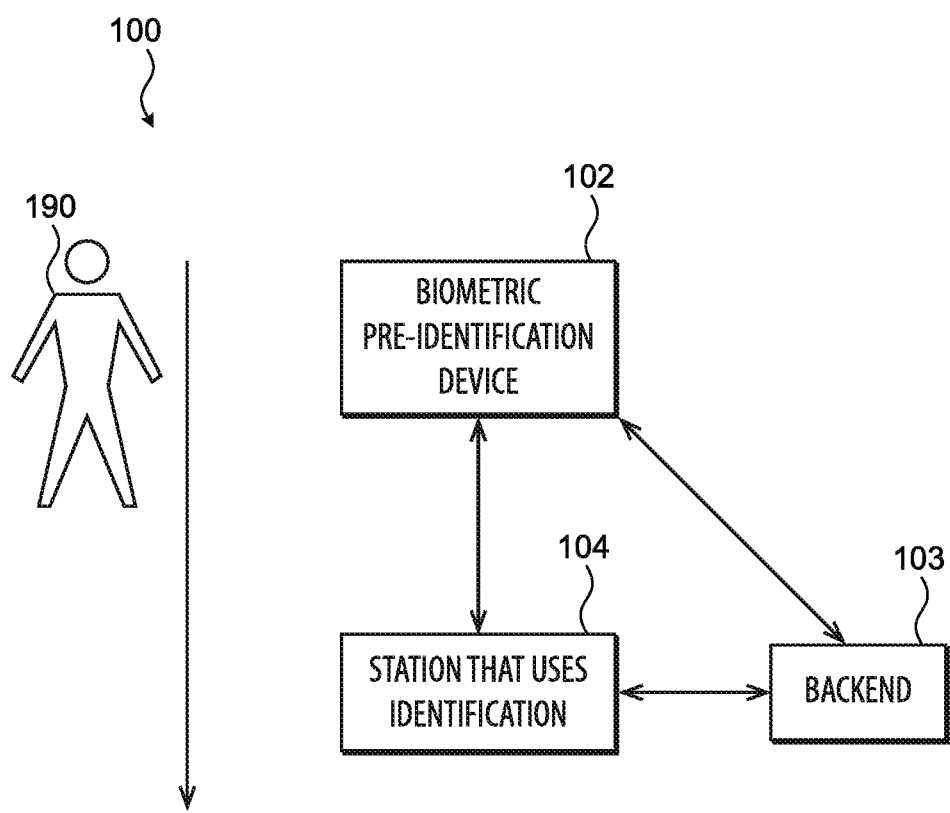
FIG. 1 depicts a first example of a system for biometric pre-identification.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

The following disclosure relates to biometric pre-identification. A station device may use identity to perform one or more actions. Identities may be determined (such as via a backend) using biometric information. A biometric pre-identification device may obtain biometric information and/or a digital representation thereof from a person approaching the station device. The biometric pre-identification device may transmit such to the station device, facilitating the station to begin and/or perform various actions. The station device may begin or perform the actions using the identity determined based on the biometric information before the person arrives at the station device.

In this way, the station device may be able to function faster and/or more efficiently as time for the actions after the person arrives at the station device may be decreased and/or eliminated. This technological solution may increase station device responsiveness, allow the station device to spread action performance across a wider time span without requiring the person to wait for action completion, and so on. This may also allow the station device to perform the function of having various actions completed upon the person's arrival as the station device was able to work on such actions prior to the person's arrival.

For example, a security station may identify a person in order to issue the person a badge or other credentials for entering a secured area. A biometric reader or other device may obtain a biometric or digital representation thereof for the person as they approach the station. The person may be identified based on the obtained biometric and that determined identity may be provided to the station prior to the person's arrival at the station. The action or actions performed at the station using identity may thus be begun and/or completed prior to the person's arrival at the station. This may save time, simplify operations, and/or allow various other benefits over systems that do not biometrically pre-identify people.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 depicts a first example of a system 100 for biometric pre-identification. The system 100 may include a biometric pre-identification device 102, a station device 101 that uses identification, and a backend 103 or other device. As a person 190 approaches the station device 101, the biometric pre-identification device 102 may obtain one or more biometrics and/or digital representations thereof for the person. The biometric and/or various digital representations thereof (such as one or more hashes, encrypted data structures, abstract biometric identifiers, and so on) may be transmitted to the backend 103. The backend 103 may identify the person 190 based on the transmitted information. The backend 103 may transmit the determined identity and/or other information to the station device 101 (and/or to the biometric pre-identification device 102 or other device that then transmits the determined identity to the station device 101. Based on the received identity, the station device 101 (and/or various devices and/or entities associated with the station device 101) may begin and/or complete various actions for which the station device 101 uses identification. The actions may be begun and/or completed before the person 190 arrives at the station device 101.

For example, a person may enter a hotel. A camera may take a picture of the person's face. The person may be identified based on the picture. Based upon the identification, a hotel check in desk may begin preparing check in for the person before the person arrives at the check in desk.

By way of another example, a person may approach an airport security screening checkpoint. A camera may take a picture of the person's iris. The person may be identified based on the picture. Based upon the identification, various security screening procedures may be set in motion prior to the person arriving at the security screening checkpoint. For example, the person may be directed to a reduced or increased security screening line. By way of another example, a boarding pass may be printed and waiting for the person. In still another example, security officials may have been called to intercept, detain, and/or arrest the person due to outstanding warrants and/or other statuses.

By way of yet another example, a person may provide a fingerprint on the way to a car rental kiosk. The person may be identified based on the fingerprint. Based upon the identification, a car meeting the person's stored preferences may be prepared and waiting for the person when the person reaches the car rental kiosk. In some cases, payment information may have been obtained and processed as well.

In yet another example, a person may enter the lobby of an office building the person works in. A camera may monitor the person's gait. The person may be identified based upon the gait. In response to the identification, an elevator may be summoned and programmed to the floor that the person works on prior to the person arriving at a bank of elevators.

In some cases of such examples, the person may be entering the lobby to go to a floor that the person does not normally work on. In such an example, the system may be configured to recognize an override action, such as the person waving the person's hand above the person's head. When the system recognizes that the person who has entered has performed such an override action, the system may not program the person's usual floor, though the system may still summon an elevator for the person prior to the person's arrival at the elevator bank. The person may then manually indicate the non-normal floor to which the person wishes to go.

In some cases, the biometric may be actively and/or passively obtained using various biometric readers. For example, one or more cameras may take one or more pictures of a person's iris, retina, face, gait, and so on. By way of another example, one or more microphones may record the person's voice. In still other examples, the person may intentionally provide one or more fingerprints, facial images, palm prints, and so on. In various cases, various combinations of active and passive biometric gathering may be performed using one or more different biometric readers.

In various cases, the person 190 for whom the biometric is obtained may be tracked between the obtaining of the biometric and arrival at the station device 101. For example, the person 190 may be tracked on camera between when the biometric is obtained (which may or may not also involve the camera) and arrival at the station device 101. This may ensure that the same person 190 identified is the person 190 for whom the actions at the station device 101 are performed. In this way, a person 190 may not be identified and actions performed at the station device 101 for them only to have another person slip in and take advantage of the actions performed for the original person 190. Various configurations are possible and contemplated.

Figure 2:
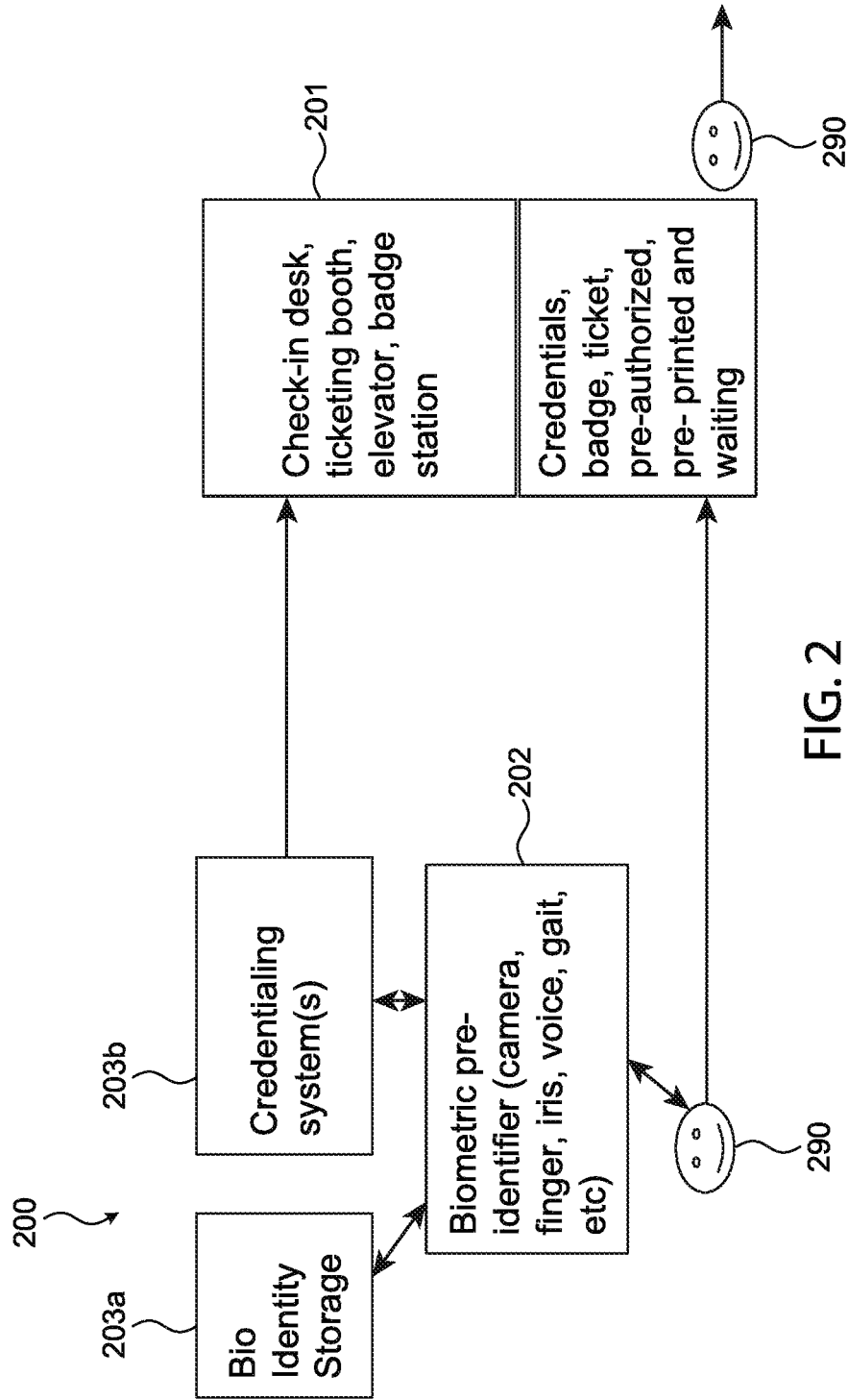
FIG. 2 depicts a second example of a system for biometric pre-identification.

FIG. 2 depicts a second example of a system 200 for biometric pre-identification. The system 200 may include a biometric pre-identifier 202 (such as a camera, fingerprint reader, iris reader, retina reader, voice recording device, gait detection device, and so on); one or more credentialing systems 203b; biometric identity storage 203a; and a check in desk, ticketing booth, elevator, badge station, or other station device 201. The biometric pre-identifier may obtain a biometric for a person 290. The person 290 may be identified using the credentialing system 203b and/or the biometric identity storage 203a. Based on the identification, the check in desk, ticketing booth, elevator, badge station, or other station device 201 may prepare and/or provide credentials, badges, tickets, pre-authorizations, and so on in a manner that is pre-printed and/or otherwise begun and/or waiting prior to the person's arrival at the check in desk, ticketing booth, elevator, badge station, or other station device 201.

In various implementations, the identification technology discussed herein may enable visitors to residences, office buildings, theme parks, or any other place that uses badging, ticketing, or identification for entry, to be pre-identified using biometrics or other identity technologies and have their credentials, ticket, or general entry mechanism waiting for them at an entry point. The credentials, ticket, or entry mechanism may be physical, electronic, and may contain any information. For example, in the case of a building's badging station, a camera might identify a visitor while walking into the building and the visitor's badge is waiting and the visitor's escort has been automatically called.

Persons to be identified may be pre-registered or somehow known to the system 200. Registration or pre-knowledge may be in any number of formats including, but not limited to, internet searches, social media identification, or inclusion in any number of approved identity lists, e.g. department of motor vehicle lists, passport lists, or any approved list that contains a photo or any other biometric or digital identity information.

Persons to be identified may have the opportunity to passively or actively provide their biometric or identification on their way to a checkpoint or other station device 201. An example of an active method may include placing their fingerprints on a biometric reader. Passive methods may include long range iris scanning or facial recognition.

Upon identification of an individual, a lookup may be done in a credential, ticketing, or permissions system to determine whether the person has access or permissions. Once identification is complete prior to a checkpoint, the individual may need not stop or wait for entry or printed credentials.

Identity integration into ticketing, badging or building entry systems may enable permissioned individuals to have their credentials automatically and immediately pre-identified. For example, for companies that use visitor badges, the badge may be pre-printed for the individual ready for pick-up. In order to determine whether a visitor has credentials, the systems 100, 200 discussed herein may integrate into local permission systems including, but not limited to, calendaring systems, access control lists, guest registers, and so on. Simultaneously, an employee who is being visited, or an appropriate escort, may be notified. Similarly, a ticket to an event may be printed and waiting, an elevator may be preselected to the correct floor, or subsequent biometric identifiers may allow access to permissioned areas.

Figure 3:
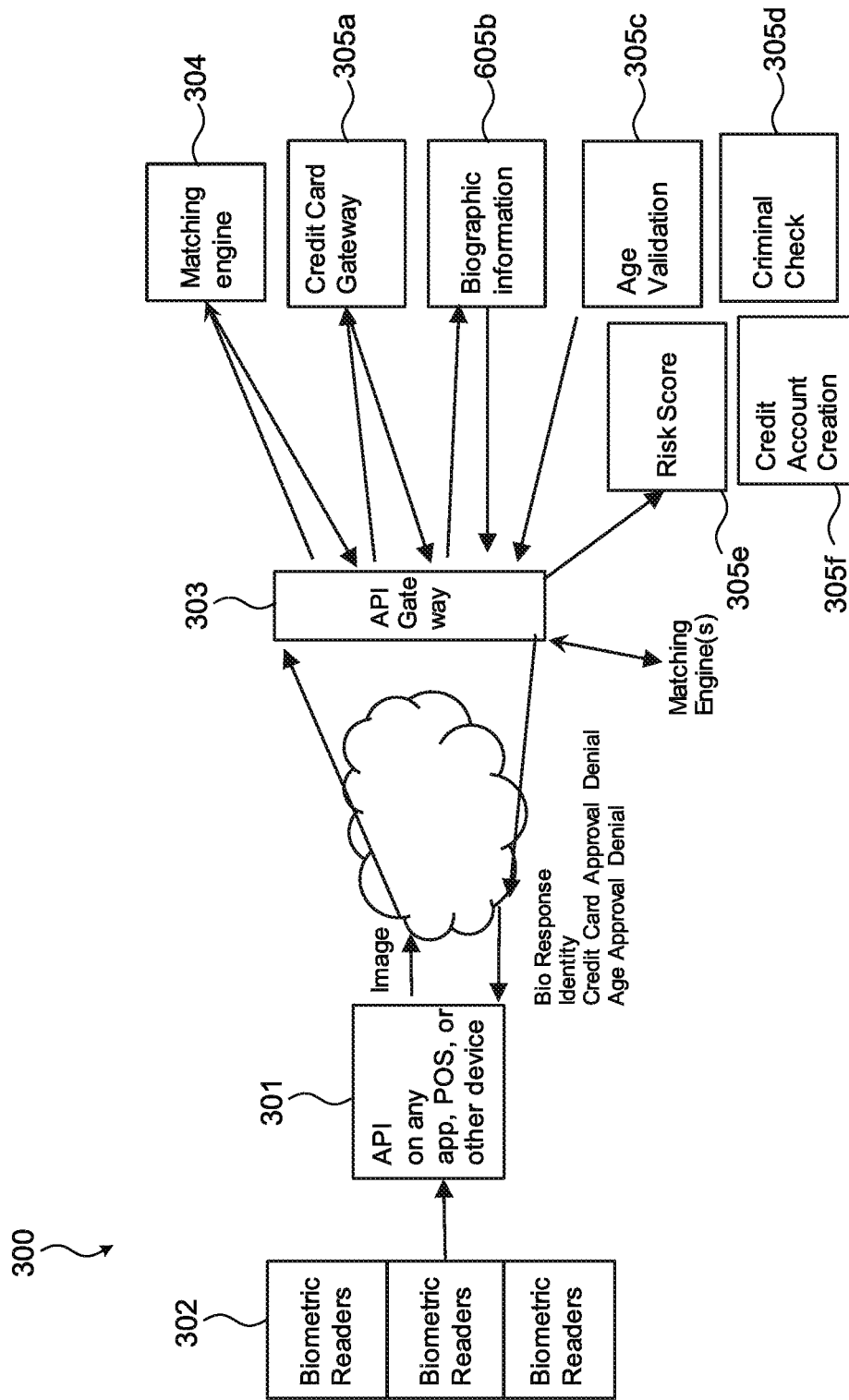
FIG. 3 depicts an example system for biometric processing that may be used in a system for biometric pre-identification, such as the systems of FIGS. 1 and/or 2.

FIG. 3 depicts an example system 300 for biometric processing that may be used in a system for biometric pre-identification, such as the systems 100, 200 of FIGS. 1 and/or 2. The system 300 may abstract a biometric ID (identifier) using one or more biometric readers 302 and/or one or more devices 301, creating an abstract biometric ID that may be an image, a data structure, a hash, or any mathematical or computer based construct. The abstract biometric ID may represent any biometric type or modality. For example, abstract biometric ID may represent a finger, face, voice, iris, retina, or gait, and so on. This may give the abstract biometric ID the ability to work with any hardware, any modality, or multiple modalities at a single time.

The abstract biometric ID, which may be secure in itself (for example, the abstract biometric ID may be a hash which may include data to uniquely compare with stored information related to the obtained biometric but may not include the biometric or a digital representation thereof in a way that allows for the biometric itself to be derived or determined), may be further secured through a multiple of protocols including dual certification https, in-flight encryption, and non-redundant encryption. This may mean that the abstract biometric ID may be encrypted in-flight using different protocols each time.

The abstraction technology of the present disclosure may allow the abstract biometric ID to be integrated with any matching engine 304 or matcher. A backend 303, gateway, or other device that receives the abstract biometric ID may detect the biometric type of the abstract biometric ID and format the abstract biometric ID according to a proper template (e.g., a format specified for and/or appropriate to the particular matching engine 304 that matches that biometric type, the formatting putting the abstract biometric ID into a form that the matching engine 304 can compare against a corresponding biometric database) of one or many templates for singular or parallel processing (abstract data structure and so on).

In the case of multi-modal abstract biometric IDs (such as combination of a facial image, an iris, a retina, and a gait and/or any other such combination of different biometric types), the backend 103 may detect each of the modalities, run each of the modalities through an appropriate matching engine 304 or matcher. Through the prioritization of modalities, scores, and statistical combinatorics, the backend 303 may determine a most accurate and/or likely match (e.g., identify the person associated with the biometric).

An associated payment account such as a credit or debit card or pre-existing payment instrument may or may not be associated with biometric payment as part of actions associated with stations that use identification as disclosed herein. Options for payment may include, but are not limited to, a credit card on file, a pre-existing credit balance, ACH, through credit based offline payments, the creation of a line of credit, and so on.

Upon pre-identification, the system 300 discussed herein may simultaneously perform pre-identification, process payments, perform actions involving identification, communicate with various servers 305a-305f, and validate any number of additional factors. These additional factors may include, but are not limited to, validating age data, financial risk, criminality, terrorism, credit risk, opening a line of credit, and so on. In some implementations, the system discussed herein may be operable to open a line of credit to process a payment that has been otherwise declined.

Multiple biometric types may be accepted at a single point of contact. The backend may determine, using the same or a different API call, which biometric type was used. The biometric API may use the abstract identifier by itself. In such cases, no additional information or hints may be required.

The biometric pre-identification system 300 discussed herein may or may not use a point of sale (POS) device 301 or system. In some implementations, the system 300 may integrate into commercial POS systems.

The biometric pre-identification system 300 may include libraries that enable the rapid reading and transmission of biometrics. Such libraries may be included for Android™, iOS™ Windows™, and/or other operating systems.

The system 300 may perform credit risk checks. This may allow for offline payments.

By using a "centralized" backend 103 (e.g., a single system that various POS or other devices may connect to for biometric pre-identification, not necessarily a single device as the backend 303 may be one or more computing devices that may interact to perform the functions discussed herein such as one or more cloud computing configurations, cooperative processing configurations, and so on) for pre-identification and/or other identity verification, biometrics may be registered once, in any location, and reused across different ecosystems. In other words, any number of different devices using the API or software may transmit abstract biometric IDs to the backend 303 without people needing to separately register the associated biometric at each device 301.

The backend 303 technology may retrieve biometric data from any repository of biometric information. In some cases, the backend 303 may store such a repository. In other cases, the repository may be stored remotely.

The backend 303 technology may distribute and/or limit credit or debit card access to improve security and maintain payment card industry (PCI) compliance. The backend 303 technology may also distribute and/or limit access to other payment options, other private information for identified people, and so on.

Users may enter one or more biometrics into any biometric reader 302 of a device 301. The device 301 may stand alone, be integrated into an on-premises POS, or be on a mobile device. There may be multiple devices present.

An API may reside in an application that is integrated into the device 301 or connected devices. Examples of such devices 301 may include, but are not limited to, a point of sale device, a mobile device, tablet, or any other computer device. The API may receive the data from the device 301 and may generate and send an abstracted, encoded biometric identifier to the backend 303. This abstract biometric ID may be of any form or structure (e.g., a hash and so on), may involve serialization or packetizing of a digital representation of the biometric, and/or various other processing. The abstract biometric ID may be unreadable on its own (for example, the abstract biometric ID may be structured in a way that can be coherently interpreted by a program that understands the format of digital data contained therein but otherwise appears to be a random string of zeroes and ones), may be of any modality (type of biometric), from any hardware. It may be sent via dual certificate HTTPS and on-the-fly unique encryption to the backend.

The backend 303 may decrypt the transmission, interpret the modality or modalities of the data structure of the abstract biometric ID, and dynamically create templates or formats associated with any number of matching engines 304 or matchers that are compliant with the sent modality or modalities. The matching engine 304 may execute on the backend 303 and/or on another device with which the backend 303 is operable to communicate.

The matching engine 304 may retrieve biometric information from any biometric repository, including the backend's own repository. In the case of multi-modal abstract biometric IDs, the backend 303 may detect each of the modalities, run each of them through the proper matching engine(s) 304 and through the prioritization of modalities, scores, statistical combinatorics, and so on, and determine a most accurate and/or likely match (e.g., identify a person associated with the biometric).

If the abstract biometric ID is identified, the abstract biometric ID may be simultaneously and/or otherwise sent to a number of pre-identification, information, validation, and/or other services or servers 305a-305f. Such services or servers 305a-305f may include, but are not limited to, an age validation service, a terrorist risk service, a criminality service, a wanted list, a credit check service, a payment engine, a line of credit account validation service, and so on.

The API may return data (which may be received from the backend 303 and/or may be transmitted by a backend 303 to a station device associated with the device 301 running the API) that indicates one or all of the requested information. For example, requested information may include, but is not limited to, whether the individual is pre-identified, the identity of the individual, information about the individual to be used with actions performed by a station device using identification, whether the individual has an approved purchase, if they're of a specific age (such as twenty-one for purchase of alcohol or gambling services), if they have a risk score that indicates either a criminal or terrorist risk factor (e.g., money laundering), if they have an approved line of credit, and so on. This return may be formatted in a variety of ways. For example, the return may be itemized, with or without explanation, be a single decline with or without an explanation, be a risk score that can be assessed per merchant either through human intervention or through code written in a POS, and so on. The API may also return results, explanations, or codes based upon predefined rules, logic, algorithms, and so on. The API may transmit the results to an associated station.

In various implementations, upon the return of a positive identity match from an identification system, the API may return an identity object or token and, potentially, biometric information that may be integrated into any permissions, access, credentialing or ticketing system that stores the identity of the person. In the case of tickets or access that uses age verification or financial eligibility, this may be done simultaneously prior to the issuing of credentials.

In the case of ticketing, payment may occur simultaneously. An associated credit card or pre-existing payment instrument may not be required to be associated with the biometric payment service. Options for payment include, but are not limited to, a credit card on file, a pre-existing credit balance, ACH, through credit based offline payments, or the creation of a line of credit.

In various implementations, prior to an entry checkpoint (e.g., ticketing booth, ticket taker, building security desk, elevator bank), a person may actively or passively present a biometric or digital identity. Examples may include a face passing a camera, iris, retina, finger, voice, gait, and so on.

The API may reside in an application that is integrated into the device 301, or a connected device, such as a mobile device, tablet, or any other computer device. The API may receive the data from the device 301 and send an abstracted, encoded biometric identifier to the backend 303. This identifier may be of any form or structure (e.g., a hash), may be unreadable on its own, and may of any modality, from any hardware. It may be sent via dual certificate HTTPS and on-the-fly unique encryption to the back-end.

The backend 303 may decrypt the transmission, interpret the modality or modalities and the data structure, and dynamically create templates or formats associated with any number of matchers compliant with the sent modality or modalities.

The matching engine 304 may retrieve biometric information from any biometric repository, including a repository of its own. In the case of multi-modal identifiers (e.g., different types of biometrics), the backend 303 may detect each of the modalities, run each of the modalities through the proper matching engine(s) and through the prioritization of modalities, scores, and statistical combinatorics, determine a most accurate and/or likely match (e.g., identify an associated person).

If the image (abstract biometric identifier) is identified, the identity may be simultaneously sent to a number of information and validation services. This may include, but not be limited to, an age validation service, a terrorist risk service, a criminality service, a wanted list, a credit check service, a payment engine, a line of credit account validation service, and so on.

The API may return data that indicates one or all of the requested information (e.g., whether the individual has approval to enter, a valid ticket, proper credentials, the elevator floor, an approved payment, age validation, and so on). This information may be integrated into on premises systems that allows entry, prints a badge, prints a ticket, operates a gate, and so on.

The information that is returned from the API may be integrated into building components. This may be performed through the Internet of things, a building's individual applications or services, and so on. For example, this may be performed through an elevator, a badging printer, a building's enterprise resource planning system, a custom platform, and so on.

By way of an additional example, a person's workplace or other associated building may be a "smart building" including any number of devices capable of communicating and/or being controlled over a communication network. In such an example, various devices of the building may respond to identification of the person. For instance, the person may be entering the building after business hours when the lights are not on, the HVAC ("heating, ventilation, and air conditioning") system is not configured for occupancy, and so on. In response to identification of the person, lights may illuminate a path to the person's office, the HVAC system may heat and/or cool as if the person's office was occupied, food and beverage machines may be activated (such as setting a coffee machine to automatically make coffee for the person), and so on.

Based upon policies defined for a particular implementation, credentials or permissions may be waiting for a person by the time they get to a particular station device, such as a security station. For example, in the case of a building's badging station, a camera may identify the person while walking into the building and their badge may be waiting for them and/or an escort may have been called.

Figure 4:
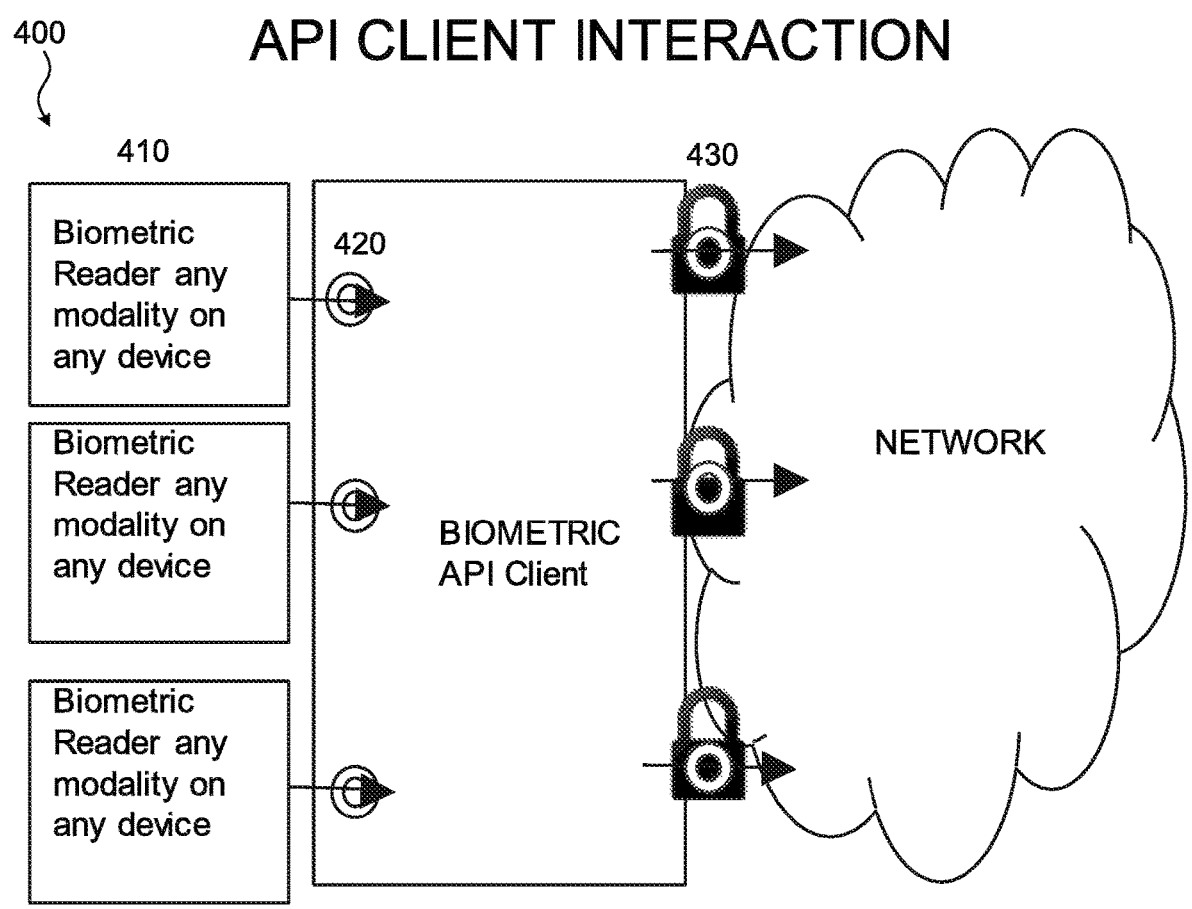
FIG. 4 depicts an example application programming interface client interaction for the system of FIG. 3.

FIG. 4 depicts an example application programming interface client interaction 400 for the system of FIG. 3. It is understood that this is provided for the purposes of example. In various implementations, other interactions may be performed, whether by an application programming interface client, other software, and so on.

410: Any biometric reader or device may be used. The device may be stand-alone, embedded in a mobile device, part of or attached to a tablet, computer, point of sale system, and so on. Rapid biometric IDs may be integrated in POS systems, including those based on Windows™, Android™, iOS™, and so on. The API may be included in an application that is connected to the device or embedded in the device.

420: The technology discussed herein may be designed to abstract the biometric ID process. This may create an abstract biometric ID that may be an image, a data structure, a hash, or any mathematical or computer based construct. The abstract biometric ID may represent any biometric type or modality. Examples include, but are not limited to, a finger, face, voice, iris, retina, or gait. This may give the disclosed system the ability to work with any hardware, any modality, or multiple modalities at a single time.

430: The abstract biometric ID, secure in itself, may be further secured through a multiple of protocols. This may include, but is not limited to, dual certification https, in-flight encryption, non-redundant encryption, and so on. This may mean that the abstract biometric ID is encrypted in-flight using different protocols each time.

Figure 5:
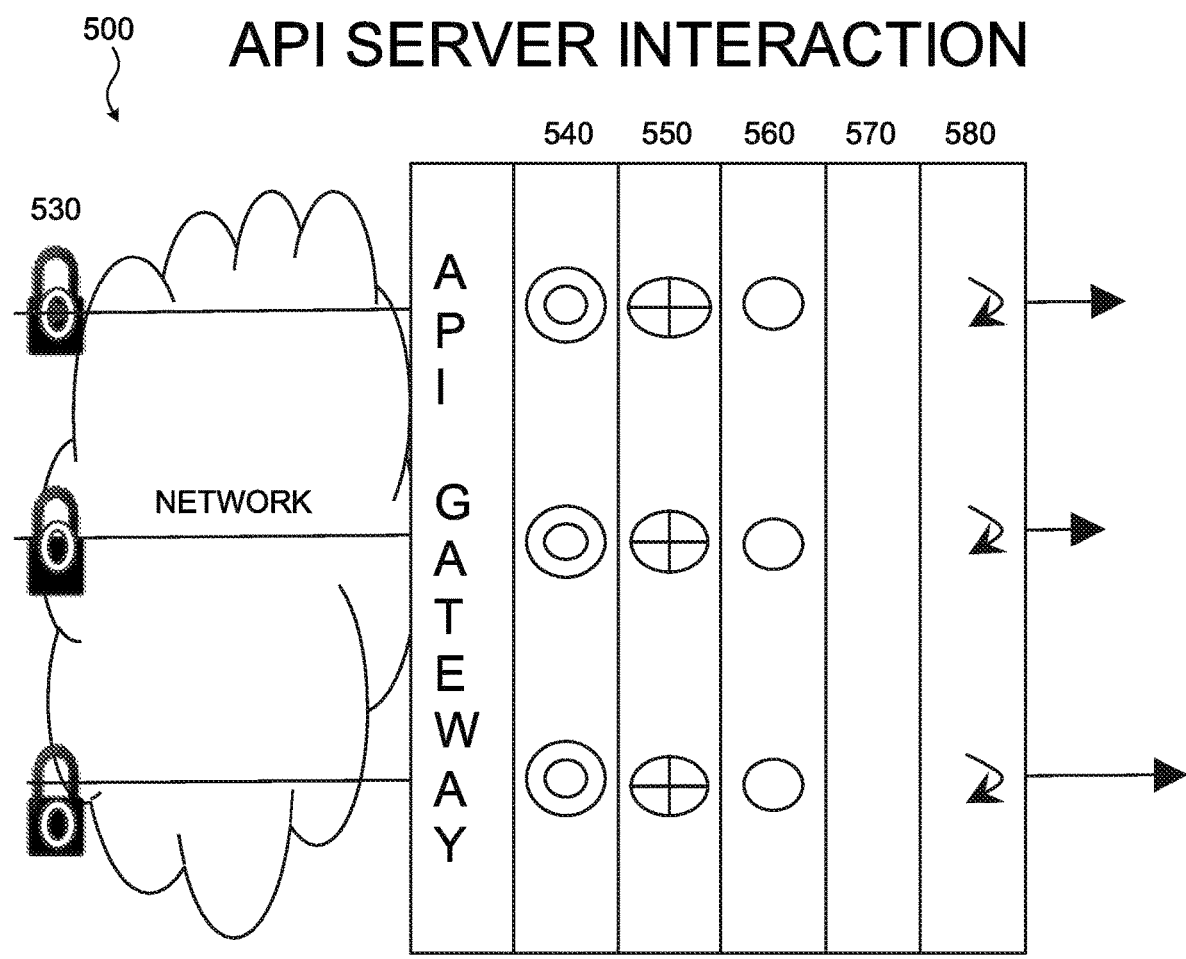
FIG. 5 depicts an example application programming interface server interaction for the system of FIG. 3.

FIG. 5 depicts an example application programming interface server interaction 500 for the system of FIG. 3. Again, it is understood that this is provided for the purposes of example. In various implementations, other interactions may be performed, whether by an application programming interface server, a backend, other devices, and so on.

540: The abstract biometric ID may be unencrypted and cast to the proper modality. In the case of multi-modal abstract biometric IDs, the modality of each may be detected.

550: The abstract biometric ID may then be converted to the proper template format for the matching engine(s) appropriate for the detected modality. Each abstract biometric ID may be run through the appropriate matching engine(s) and through the prioritization of modalities, scores, statistical combinatorics, and so on to determine the most accurate match.

560: The person associated with the biometric may be identified. In some cases, a person may not be identified as the biometric may not have been registered with the system or the biometric repository. In such a case the backend may return an error, prompt for an enrollment process, and/or perform various other actions related to a failed identification.

570: Prior to returning the identification, the abstract biometric ID may be sent to various services or servers in order to return various requested or other information. Services or servers may include, but are not limited to, a risk score, a credit account creation, payment engine, a criminal data check, and so on.

580: Return identification data and associated information. This may be returned to the API, the device associated with the API, an associated device, a station associated with the device running the API, and so on.

Figure 6:
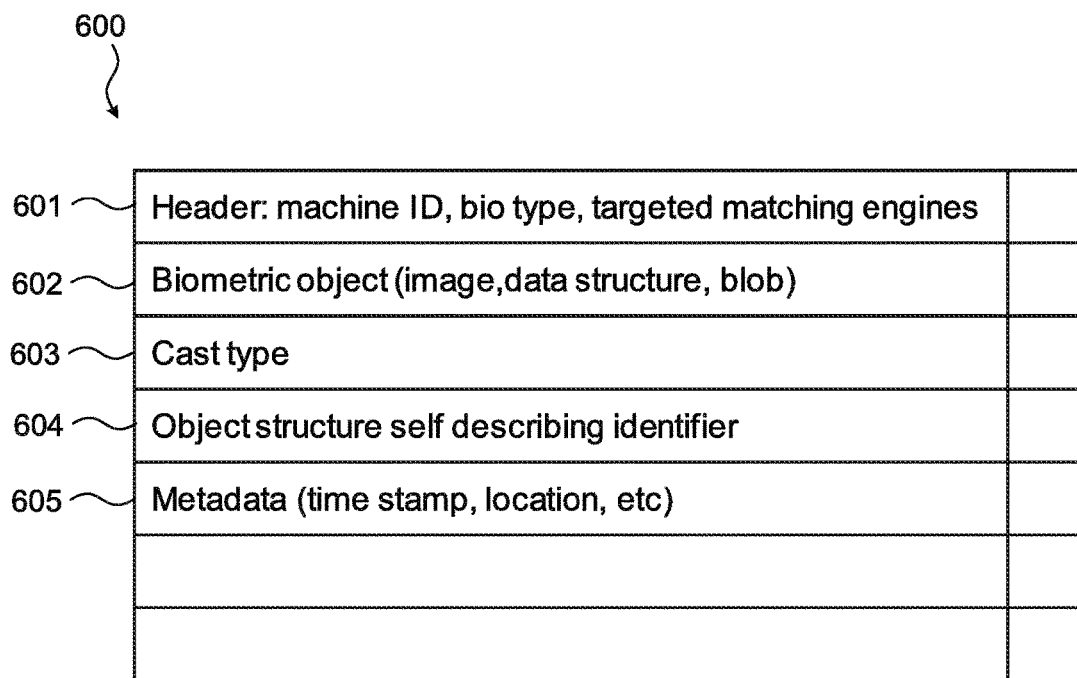
FIG. 6 depicts an example data structure that may be used for the abstracted biometric identifier in the system of FIG. 3.

FIG. 6 depicts an example data structure 600 that may be used for the abstracted biometric identifier in the system of FIG. 3. The data structure 600 may include a header 601. Such a header 601 may include a machine identifier, a biometric type, a specification of a targeting matching engine(s), and so on. The data structure 600 may also include a biometric object 602 or digital representation thereof, such as an image, data structure, blob, and so on. The data structure may also include a cast type 603, an object structure self-describing identifier 604, metadata 605 (such as a time stamp, location, or the like), and so on.

Figure 7:
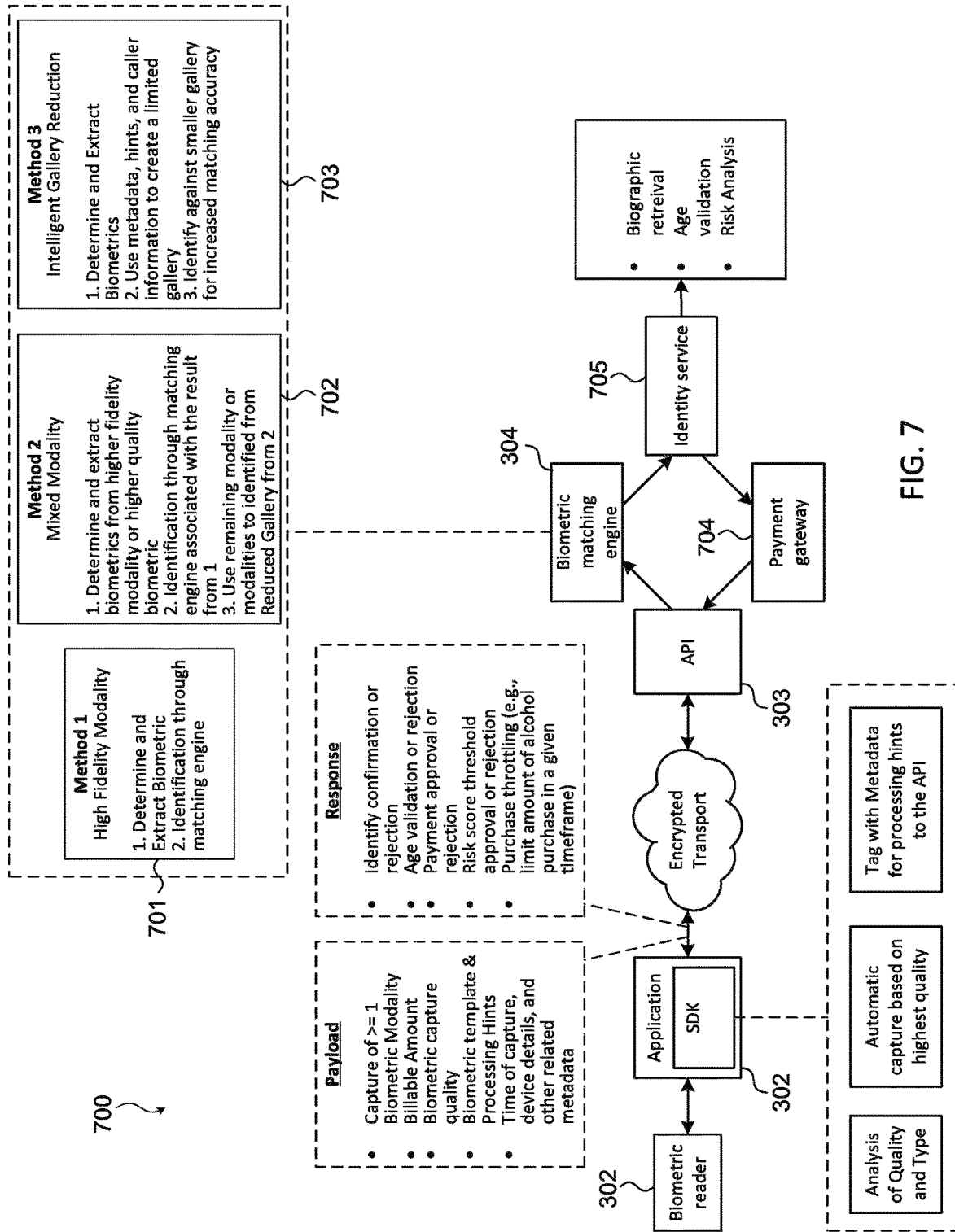
FIG. 7 depicts an example process flow of the system of FIG. 3.

FIG. 7 depicts an example process flow 700 of the system 300 of FIG. 3. As shown, software on a POS or other device may perform various actions related to the biometric. These may include analysis on the quality and type of the biometric, automatic capture based on highest quality, tagging with metadata for processing hints to the API, and so on.

The abstract biometric ID and/or other payload provided by the API may include capture of one or more biometric modalities, billable amounts, biometric capture quality indications, biometric template and/or processing hints or directions, times of capture, device details, other related metadata, and so on. The response may include pre-identification, identity confirmation or rejection, age validation or rejection, payment approval or rejection, risk score threshold approval or rejection, purchase throttling (e.g., a limit on an amount of alcohol or other controlled item that may be purchased in a particular time frame), and so on.

As shown, identity determination may use the formatted abstract biometric ID, template, or other processed version of the abstract biometric ID to determine identity using a number of different methods. A first method 701 may be a high fidelity modality method. In such a method, the identity determination may determine and extract biometrics and then perform identification through a matching engine 304.

A second method 702 may be a mixed modality method. In such a method, biometrics may be determined and extracted from a higher fidelity modality or higher quality biometric, a first identification may be performed through a matching engine associated with the determined and extracted biometric, and a remaining modality or modalities may be used to perform a second identification from a reduced gallery resulting from the first identification (such as where a facial recognition is used as a first identification to generate a reduced biometric gallery for comparison of irises).

A third method 703 may be an intelligent gallery reduction method. In such a method, biometrics may be determined and extracted; metadata, hints, and caller information may be used to generate a limited biometric gallery for comparison, and the determined and extracted biometric may be identified against the generated limited biometric gallery for increased matching accuracy.

It is understood that this first, second, and third methods 701, 702, 703 are provided for the purpose of example. Identity determination may be performed using a variety of different methods without departing from the scope of the present disclosure.

As further illustrated, an identity service 705 may provide biographical information retrieval, age validation, risk analysis, and so on. A payment gateway 704 may provide functions such as payment processing, payment throttling (e.g., limits to the amount of money that may be charged to various payment accounts whether within a particular time limit or in general), and so on.

Again, it is understood that the example process flow of FIG. 7 is provided for the purposes of example. In various implementations, the system 300 of FIG. 3 and/or other systems or devices that use various techniques of the present disclosure may perform a variety of different processes with various process flows without departing from the scope of the present disclosure.

Figure 8:
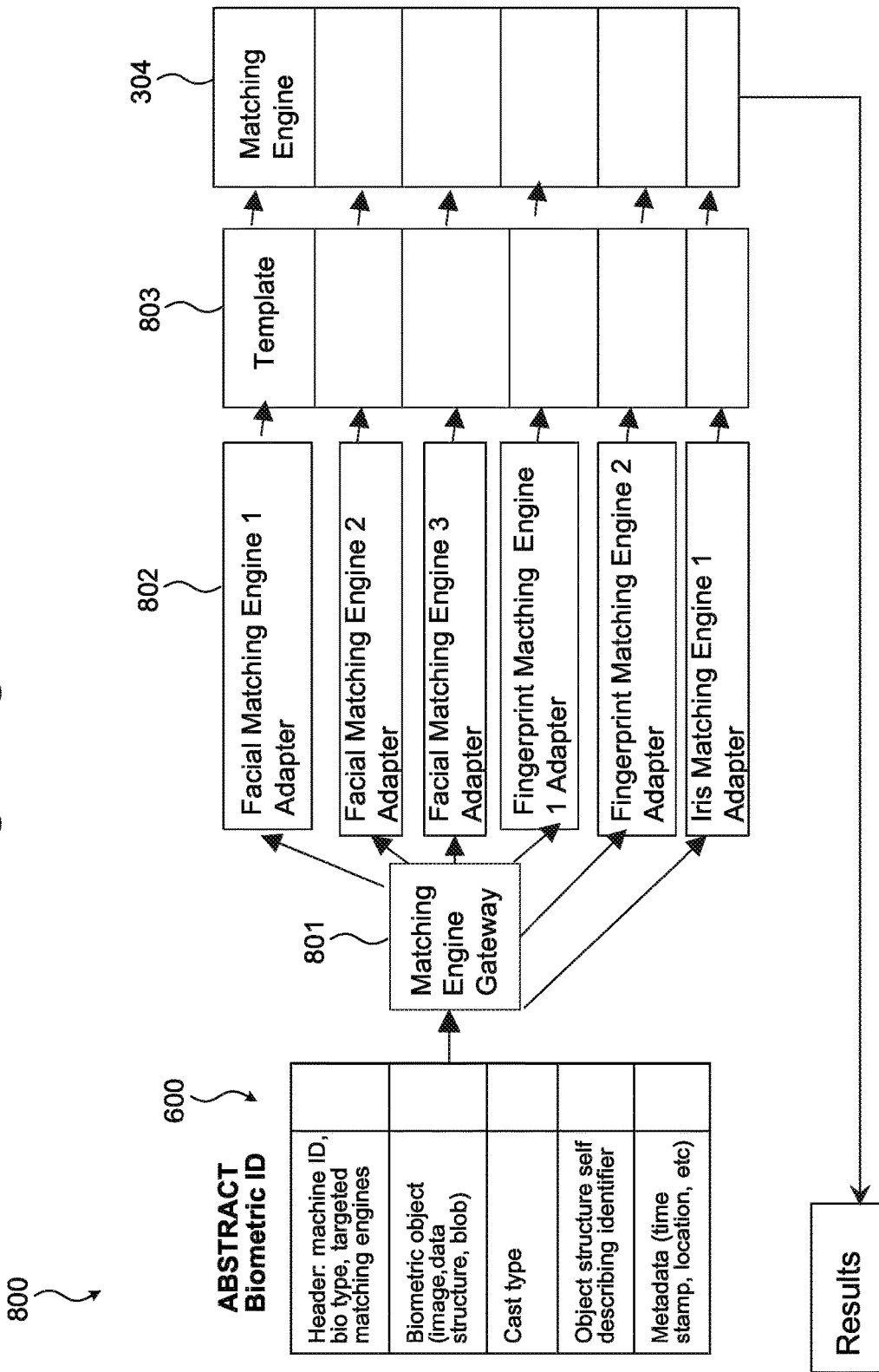
FIG. 8 depicts an example of matching engine abstraction that may be used in the present disclosure.

FIG. 8 depicts an example of matching engine abstraction 800 that may be used in the present disclosure. This may be performed by the backend 303 or gateway illustrated in FIGS. 3-5 and 7. As illustrated, the abstract biometric ID data structure 600 may be provided to a matching engine gateway 801. The matching engine gateway 801 may provide the abstract biometric ID data structure 600 to one or more adapters 802 associated with a particular matching engine 304 (e.g., a software development kit or API associated with the particular matching engine). The adapter 802 associated with the particular matching engine may format the abstract biometric ID data structure 600 and/or information contained therein into a template 803 or format that the particular matching engine 304 is configured to work with. The template 803 may then be provided to the particular matching engine 304, which may then perform matching on the template to determine the identity of the person associated with the abstract biometric ID data structure 600 from which the template 803 was generated.

For example, the matching engine gateway 801 may provide an abstract biometric ID data structure 600 associated with the face of a person to a facial matching engine adapter 802 associated with a matching engine 304 provided by Innovatrics™. By way of another example, the matching engine gateway 801 may provide an abstract biometric ID data structure 600 associated with the face of a person to a facial matching engine adapter 802 associated with a matching engine 304 provided by Chui™. By way of still another example, the matching engine gateway 801 may provide an abstract biometric ID data structure 600 associated with the face of a person to a facial matching engine adapter 802 associated with a matching engine 304 provided by Rank One Computing™. By way of yet another example, the matching engine gateway 801 may provide an abstract biometric ID data structure 600 associated with the fingerprint of a person to a fingerprint matching engine adapter 802 associated with a matching engine 304 provided by Innovatrics™. In still another example, the matching engine gateway 801 may provide an abstract biometric ID data structure 600 associated with the fingerprint of a person to a fingerprint matching engine adapter 802 associated with a matching engine 304 provided by BioMoRF Systems Limited™. In yet another example, the matching engine gateway 801 may provide an abstract biometric ID data structure 600 associated with the iris of a person to an iris matching engine adapter 802 associated with a matching engine 304 provided by FotoNation™.

Figure 9:
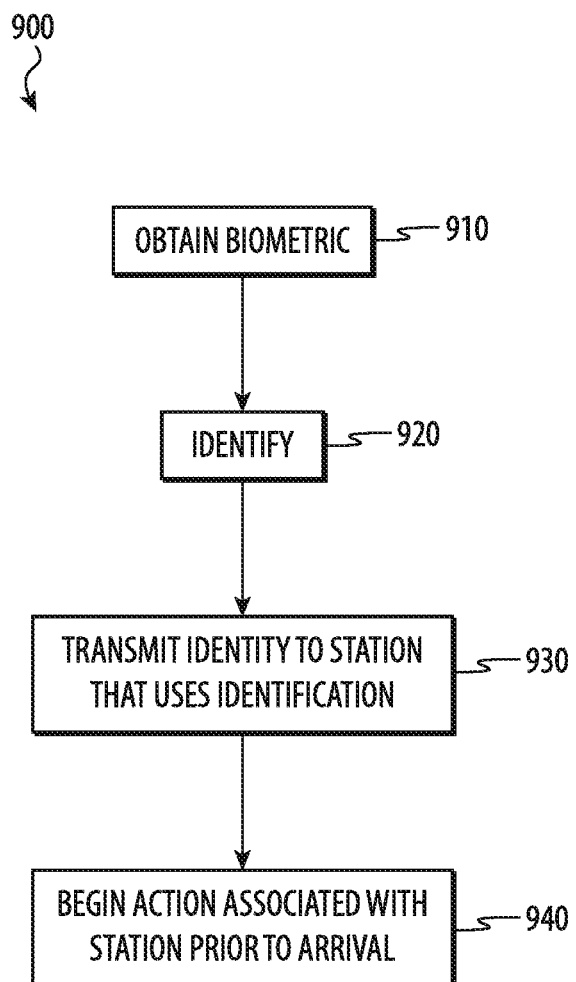
FIG. 9 depicts a first example method of biometric pre-identification. This first example method may be performed by the system of FIG. 1.

FIG. 9 depicts a first example method 900 of biometric pre-identification. At 910 a biometric may be obtained. The biometric may be obtained actively and/or passively. At 920, a person may be identified based on the biometric. The person may be identified by abstracting the biometric and/or a digital representation thereof into an abstract biometric ID and using a backend or other device to identify the person based on the abstract biometric ID. At 930, the determined identity may be transmitted to a station device that uses identification. For example, the station device may be a hotel desk that registers a guest based upon a determined identity, a security station that provides a badge or other credentials based upon the determined identity, an airport security screening station that allows entry into the airport based upon the determined identity, and so on. At 940, an action associated with the station that uses the identity is begun and/or completed prior to the person's arrival at the station device. For example, at a security station that provides a badge or other credentials based upon the determined identity, the security station may begin or complete printing the badge prior to the person's arrival at the security station. This may simplify the actions of the station, reduce the person's time at the station so he or she does not have to wait for the badge to be printed, and so on.

In various examples, this example method 900 may be implemented as a group of interrelated software modules or components that perform various functions discussed herein. These software modules or components may be executed by one or more computing devices. For example, these software modules or components may be executed by the biometric pre-identification device 102, the station device 101, and/or the backend device 103 of FIG. 1.

Although the example method 900 is illustrated and described as including particular operations performed in a particular order, it is understood that this is an example. In various implementations, various orders of the same, similar, and/or different operations may be performed without departing from the scope of the present disclosure.

For example, 940 is illustrated and described as beginning the action prior to the person's arrival at the station device. However, in some implementations, the action may be completed before the person's arrival at the station device. Various configurations are possible and contemplated without departing from the scope of the present disclosure.

In various embodiments, a system for biometric pre-identification may include a biometric pre-identification device that obtains a biometric for a person and a station device. The station device may receive an identity of the person determined using the biometric and begin an action using the identity prior to arrival of the person at the station device.

In some examples, the system may track the person between obtaining of the biometric and arrival of the person at the station device. In various examples, the biometric pre-identification device may be a biometric reader that is incorporated into or connected to the station device.

In numerous examples, the action may involve determining permissions for the person. In some such examples, the action may further include preparing credentials to provide using the permissions. In various such examples, the action may further include preparing access for the person using the permissions. In various examples, the action may involve determining a device configuration for the person and configuring a device using the device configuration.

Figure 10:
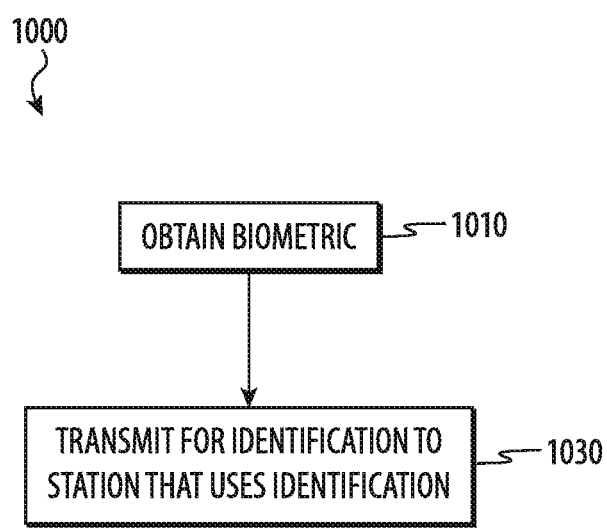
FIG. 10 depicts a second example method of biometric pre-identification. This second example method may be performed by the system of FIG. 1.

FIG. 10 depicts a second example method 1000 of biometric pre-identification. At 1010, a biometric may be obtained. At 1030, the biometric may be transmitted for identification to a station device that uses identification. The biometric and/or a digital representation or abstraction thereof may be transmitted to a backend or other device or devices that performs the identification and returns such to the device that transmitted the biometric, a station device that uses the identification associated with the transmitted biometric, and so on.

In various examples, this example method 1000 may be implemented as a group of interrelated software modules or components that perform various functions discussed herein. These software modules or components may be executed by one or more computing devices. For example, these software modules or components may be executed by the biometric pre-identification device 102, the station device 101, and/or the backend device 103 of FIG. 1.

Although the example method 1000 is illustrated and described as including particular operations performed in a particular order, it is understood that this is an example. In various implementations, various orders of the same, similar, and/or different operations may be performed without departing from the scope of the present disclosure.

For example, 1030 illustrates and describes transmitting the biometric for identification. However, in some implementations, the same device that obtains the biometric may perform the identification. Various configurations are possible and contemplated without departing from the scope of the present disclosure.

In numerous implementations, a biometric pre-identification device may include a biometric reader, at least one non-transitory storage medium that stores instructions, a communication unit, and at least one processor. The at least one processor may execute the instructions to obtain a digital representation of a biometric via the biometric reader for a person approaching a station device that uses identification and facilitate the station device taking an action using an identity of the person by transmitting the digital representation of the biometric via the communication unit for determination of the identity.

In some examples, the digital representation of the biometric may include at least two different types of biometrics for the person. In various examples, the digital representation of the biometric may be at least one of a gait of the person, a retina of the person, an iris of the person, or at least a portion of a face of the person. In numerous examples, the digital representation of the biometric may include an override action that signals to override performance of a particular action.

In various examples, the biometric pre-identification device may track the person to the station device after the digital representation of the biometric is obtained. In some examples, the biometric reader may be a camera.

Figure 11:
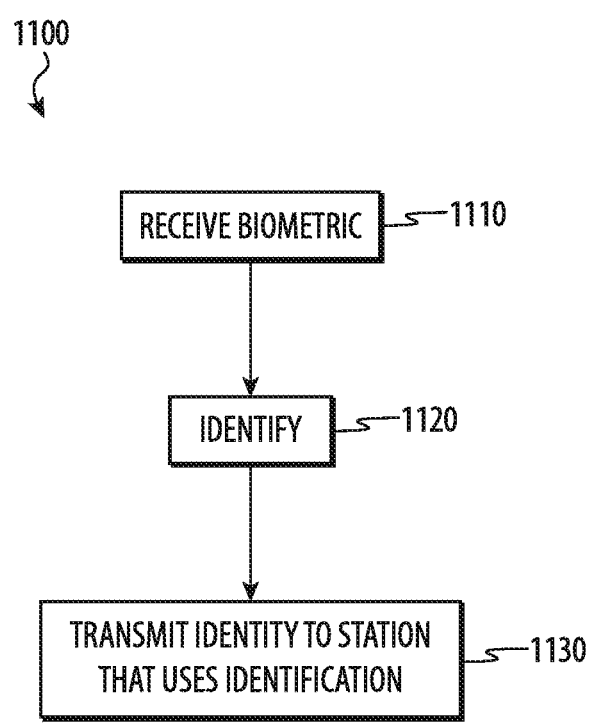
FIG. 11 depicts a third example method of biometric pre-identification. This third example method may be performed by the system of FIG. 1.

FIG. 11 depicts a third example method 1100 of biometric pre-identification. At 1110, a biometric and/or a digital representation or abstraction thereof may be received. At 1120, a person may be identified based on the received biometric. At 1130, the determined identity may be transmitted to a station device that uses identification, the device that transmitted the biometric and associated with a station device that uses identification, and so on.

In various examples, this example method 1100 may be implemented as a group of interrelated software modules or components that perform various functions discussed herein. These software modules or components may be executed by one or more computing devices. For example, these software modules or components may be executed by the biometric pre-identification device 102, the station device 101, and/or the backend device 103 of FIG. 1.

Although the example method 1100 is illustrated and described as including particular operations performed in a particular order, it is understood that this is an example. In various implementations, various orders of the same, similar, and/or different operations may be performed without departing from the scope of the present disclosure.

For example, in some implementations, the example method 1100 may include the further operations of obtaining various information (such as a credit score, a background check, and so on) related to the identity. In various examples of such implementations, the information may be transmitted along with the identity. Various configurations are possible and contemplated without departing from the scope of the present disclosure.

Figure 12:
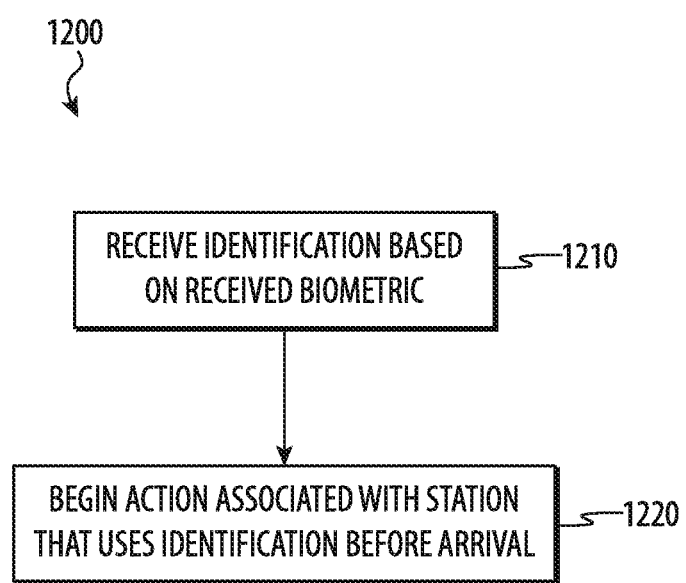
FIG. 12 depicts a fourth example method of biometric pre-identification. This fourth example method may be performed by the system of FIG. 1.

FIG. 12 depicts a fourth example method 1200 of biometric pre-identification. At 1210, an identification based on a received biometric may be received. The identification may be received from a backend or other device that received biometric and/or a digital representation or abstraction thereof from a biometric reader associated with the station and identified an associated person based thereon. The identification may also be received from a device associated with the biometric reader that transmitted the biometric and/or a digital representation or abstraction thereof to the backend or other device and received the identification in response. At 1220, an action associated with the station that uses identification may be begun and/or completed. The action may be begun and/or completed before the person arrives at a station where the action is performed and/or associated with performance of the action.

In various examples, this example method 1200 may be implemented as a group of interrelated software modules or components that perform various functions discussed herein. These software modules or components may be executed by one or more computing devices. For example, these software modules or components may be executed by the biometric pre-identification device 102, the station device 101, and/or the backend device 103 of FIG. 1.

Although the example method 1200 is illustrated and described as including particular operations performed in a particular order, it is understood that this is an example. In various implementations, various orders of the same, similar, and/or different operations may be performed without departing from the scope of the present disclosure.

For example, in some implementations, the example method 1200 may further include obtaining and/or transmitting the biometric. Various configurations are possible and contemplated without departing from the scope of the present disclosure.

In some embodiments, a station device that uses identification in a biometric pre-identification system may include at least one non-transitory storage medium that stores instructions, a communication unit, and at least one processor. The at least one processor may execute the instructions to receive an identity of a person via the communication unit, the identity determined using a biometric obtained by a biometric pre-identification device, and perform an action using the identity prior to arrival of the person at the station device.

In various examples, the action may include determining a reservation for the person and performing a task in fulfillment of the reservation. In some examples, the action may include operating an entry mechanism using the identity. In numerous examples, the action may include summoning an elevator and programming a floor for the elevator. In various examples, the action may include adjusting a light or a heating, ventilation, and air conditioning system.

In some examples, the action may include determining a task previously requested by the person and arranging for the task to be performed. In numerous examples, the action may include determining an entitlement for the person and arranging for the entitlement to be provided.

Figure 13:
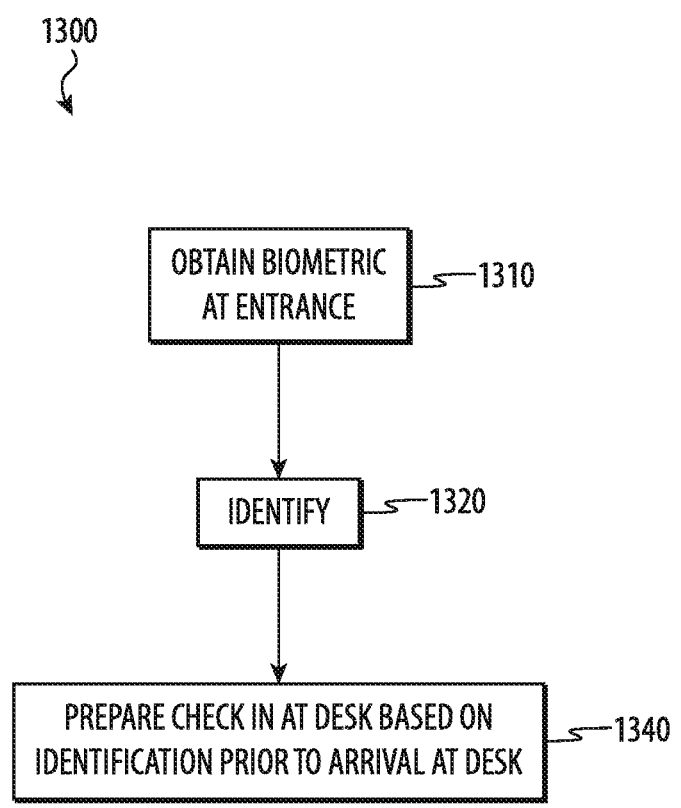
FIG. 13 depicts a fifth example method of biometric pre-identification. This fifth example method may be performed by the system of FIG. 1.

FIG. 13 depicts a fifth example method 1300 of biometric pre-identification. At 1310, a biometric may be obtained at an entrance to a hotel. For example, a camera mounted over the front door of a hotel may capture a person's face, gait, and so on. At 1320, the person associated with the biometric may be identified. At 1340, check in at a hotel desk may be prepared based on the identification prior to the person's arrival at the hotel desk. This may involve filling in personal information for the person into a hotel system, preparing room keys, determining available rooms, summoning bellhops, arranging services, obtaining financial information, obtaining room preferences, and so on.

Although the above describes services being arranged for an identified person at a hotel check in desk, any number of different services may be arranged for a person identified at a variety of different kinds of stations. Various arrangements are possible and contemplated.

For example, a person may be identified approaching an airline check in desk. The system may store information indicating that the identified person uses assistance such as a wheelchair in the airport. As such, an attendant with a wheelchair may be summoned to the airline check in desk to provide assistance to the identified person.

By way of another example, a season ticket holder at a ballpark may have a standing order for food and drinks that the person regularly requests when attending games. When the person is identified approaching a ticket kiosk, concessions may be alerted to prepare the food and drinks according to the standing order and have them waiting at the person's seats when they arrive.

In still another example, a person may obtain a line of credit at a casino when coming to play. The person may be identified as they enter the casino and the line of credit may be established for them. Corresponding chips or an electronic representation of the line of credit may be thus available for the identified person when they approach a cashier's window, customer service desk, gaming table or machine, and so on. Alternatively and/or additionally, a server may be summoned to bring the corresponding chips or the electronic representation of the line of credit to the person on the casino floor so the identified person does not have to perform those actions himself.

In yet another example, a cruise ship may provide a number of different activities such as shuffleboard. The person may enter portions of the cruise ship associated with the different activities. Upon identification of the person entering a portion of the cruise ship associated with a particular activity, facilities may be prepared for the person to take part in the activity. For example, a shuffleboard court may be reserved for the person.

In yet another example, a person approaching a hotel desk may be identified and determined to be associated with a VIP account status. As such, a bottle of wine or other complimentary gift may be sent to the room associated with the identified person to reward the identified person's VIP status.

In various examples, this example method 1300 may be implemented as a group of interrelated software modules or components that perform various functions discussed herein. These software modules or components may be executed by one or more computing devices. For example, these software modules or components may be executed by the biometric pre-identification device 102, the station device 101, and/or the backend device 103 of FIG. 1.

Although the example method 1300 is illustrated and described as including particular operations performed in a particular order, it is understood that this is an example. In various implementations, various orders of the same, similar, and/or different operations may be performed without departing from the scope of the present disclosure.

For example, although 1310 is illustrated and described as obtaining a biometric at an entrance, it is understood that this is an example. In various implementations, various biometrics may be obtained at various different locations. Various configurations are possible and contemplated without departing from the scope of the present disclosure.

Although particular methods involving particular operations have been illustrated and described, it is understood that these are examples. In various implementations, various arrangements of the same, similar, and/or different operations may be performed without departing from the scope of the present disclosure. Various configurations are possible and contemplated.

Aspects of the present disclosure may be performed by one or more devices, such as one or more computing devices, that may be configured as part of a system. For example, one or more computing devices that perform one or more aspects of this disclosure may be part of a cloud computing system, cooperative computing arrangement, and so on. Such devices may include one or more processing units, one or more non-transitory storage media (which may take the form of, but is not limited to, a magnetic storage medium; optical storage medium; magneto-optical storage medium; read only memory; random access memory; erasable programmable memory; flash memory; and so on), and/or other components. The processing unit may execute one or more instructions stored in the non-transitory storage medium to perform one or more processes that utilize one or more of the techniques disclosed herein for biometric pre-identification.

Figure 14:
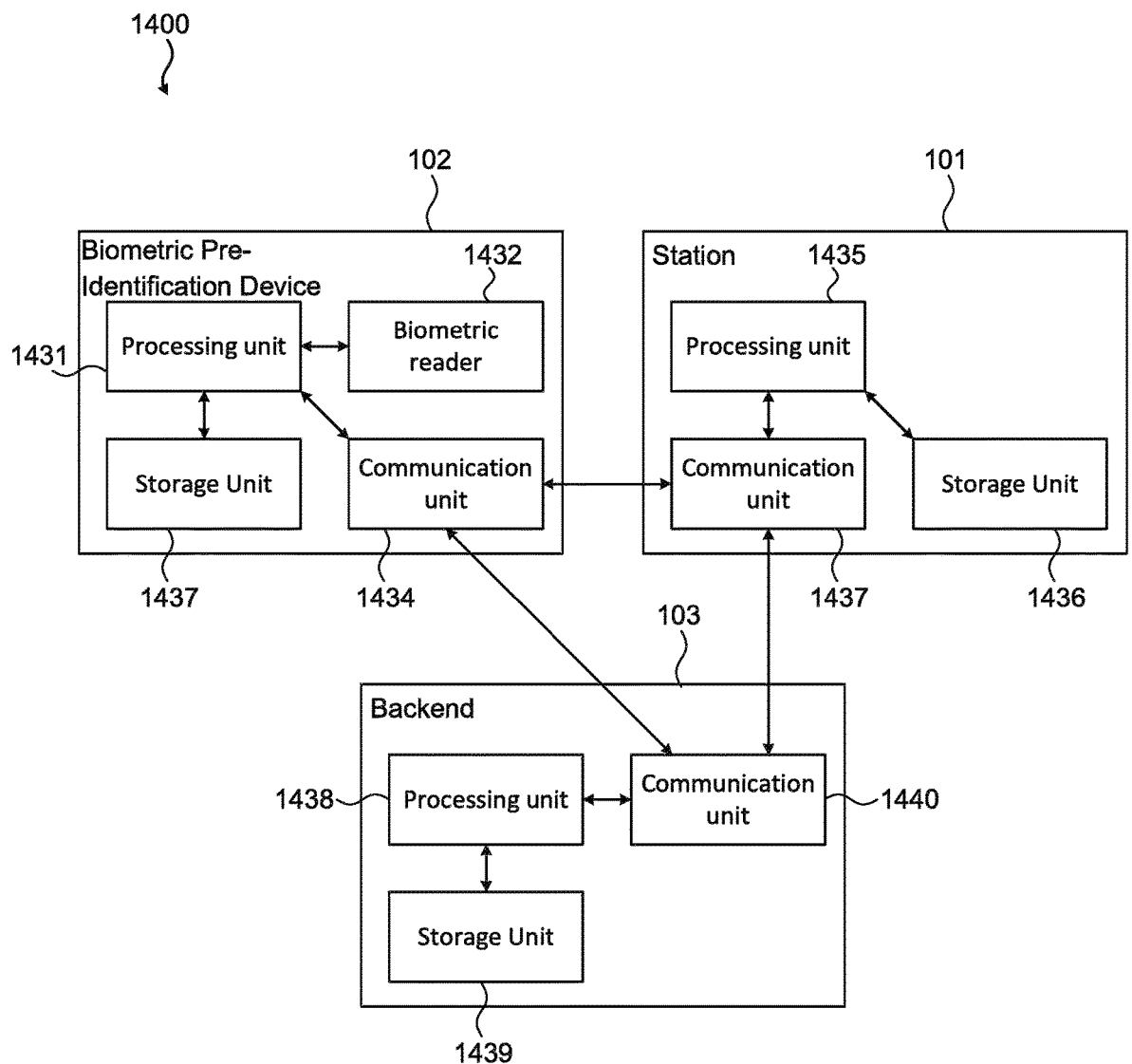
FIG. 14 depicts an example of functional relationships between components that may be used to implement the biometric pre-identification device, the station device, and the backend in the system of FIG. 1.

For example, FIG. 14 depicts an example 1400 of functional relationships between components that may be used to implement the biometric pre-identification device 102, the station device 101, and the backend 103 in the system 100 of FIG. 1. The biometric pre-identification device 102 may include one or more processing units 1431 or other processors or controllers, biometric readers 1432, communication units 1434, non-transitory storage media 1433, and so on. The processing unit 1431 may execute instructions stored in the non-transitory storage medium 1433 in order to perform various functions. Such functions may include, but are not limited to, obtaining biometric information using the biometric reader 1432, facilitating the station device 101, taking actions using identities by transmitting biometric information to the station device 101, creating one or more abstract biometric IDs, communicating with the station device 101 and/or the backend 103 using the communication unit 1434, and so on.

Similarly, the station device 101 may include one or more processing units 1435 or other processors or controllers, communication units 1437, non-transitory storage media 1436, and so on. The processing unit 1435 may execute instructions stored in the non-transitory storage medium 1436 in order to perform various functions. Such functions may include, but are not limited to, receiving biometric information from the biometric pre-identification device 102, receiving identifications from the backend 103, communicating with the biometric pre-identification device 102 and/or the backend 103 using the communication unit 1437, beginning or performing various actions based on identifications, and so on.

Likewise, the backend 103 may include one or more processing units 1438 or other processors or controllers, communication units 1440, non-transitory storage media 1439, and so on. The processing unit 1438 may execute instructions stored in the non-transitory storage medium 1439 in order to perform various functions. Such functions may include, but are not limited to, communicating with the station device 101 and/or the biometric pre-identification device 102 using the communication unit 1440, receiving one or more abstract biometric IDs, determining the modality of an abstract biometric ID, formatting an abstract biometric ID for a matching engine, converting an abstract biometric ID to a template, determining identity using an abstract biometric ID, returning information, and so on.

Although a particular configuration of devices is shown and described, it is understood that this is an example. Various configurations are possible and contemplated without departing from the scope of the present disclosure. For example, the station device 101 and the biometric pre-identification device 102 are shown and described as separate, distinct devices. However, in various implementations, the biometric pre-identification device 102 may be a biometric reader 1432 incorporated into and/or communicably coupled to the station device 101.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and and/or other personal data should implement and consistently prevent any collection, analysis, storage, and/or other use of any biometric and/or other personal data blocked by the person from whom such biometric and/or other personal data is derived.

As described above and illustrated in the accompanying figures, the present disclosure relates to biometric pre-identification. A station device may use identity to perform one or more actions. Identities may be determined (such as via a backend) using biometric information. A biometric pre-identification device may obtain biometric information and/or a digital representation thereof from a person approaching the station device. The biometric pre-identification device may transmit such to the station device, facilitating the station to begin and/or perform various actions. The station device may begin or perform the actions using the identity determined based on the biometric information before the person arrives at the station device. In this way, the station device may be able to function faster and/or more efficiently as time for the actions after the person arrives at the station device may be decreased and/or eliminated. This technological solution may increase station device responsiveness, allow the station device to spread action performance across a wider time span without requiring the person to wait for action completion, and so on. This may also allow the station device to perform the function of having various actions completed upon the person's arrival as the station device was able to work on such actions prior to the person's arrival.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for biometric pre-identification, comprising:
a biometric pre-identification device; and
a financial device; wherein:
the biometric pre-identification device is configured to:
obtain a digital representation of a biometric for a person prior to arrival of the person at the financial device; and
determine an identity of the person using the digital representation of the biometric; and
the financial device is configured to:
receive an indication of the identity from the biometric pre-identification device; and
verify that the identity corresponds to a payment account used via the financial device after the arrival of the person at the financial device.

2. The system of claim 1, wherein the financial device obtains information for the payment account that is associated with the identity.

3. The system of claim 1, wherein the financial device obtains information for the payment account from the person after the arrival of the person at the financial device.

4. The system of claim 1, wherein the financial device receives a risk associated with the person from the biometric pre-identification device.

5. The system of claim 1, wherein the biometric pre-identification device comprises a mobile device associated with the person.

6. The system of claim 1, wherein the biometric pre-identification device obtains the digital representation of the biometric for the person via an image sensor.

7. The system of claim 1, wherein the biometric pre-identification device determines the identity of the person using the digital representation of the biometric by transmitting the digital representation of the biometric to a backend.

8. A system for biometric pre-identification, comprising:
a biometric pre-identification device; and
a financial device; wherein:
the biometric pre-identification device is configured to:
obtain a digital representation of a biometric for a person prior to arrival of the person at the financial device; and
determine an identity of the person using the digital representation of the biometric; and
the financial device is configured to:
receive an indication of the identity from the biometric pre-identification device; and use information associated with the identity to facilitate a financial transaction after the arrival of the person at the financial device.

9. The system of claim 8, wherein the biometric comprises at least a portion of a face of the person.

10. The system of claim 8, wherein the biometric comprises at least a portion of a retina of the person.

11. The system of claim 8, wherein the biometric comprises at least a portion of an iris of the person.

12. The system of claim 8, wherein the financial device facilitates the financial transaction by verifying that the person is authorized to engage in the financial transaction.

13. The system of claim 8, wherein the financial device facilitates the financial transaction by verifying that the person is authorized to use a payment account associated with the financial transaction.

14. The system of claim 8, wherein the financial device facilitates the financial transaction by processing a payment for the financial transaction.

15. A system for biometric pre-identification, comprising:
a biometric pre-identification device; and
an accommodation station; wherein:
the biometric pre-identification device is configured to:
obtain a digital representation of a biometric for a person prior to arrival of the person at the accommodation station; and
determine an identity of the person using the digital representation of the biometric; and
the accommodation station is configured to:
receive an indication of the identity from the biometric pre-identification device; and
perform an action if the identity corresponds to an accommodation reservation.

16. The system of claim 15, wherein the action comprises allowing the person access.

17. The system of claim 15, wherein the action comprises transmitting a notification to a recipient device.

18. The system of claim 17, wherein the recipient device is operable to respond to the notification to allow the person access.

19. The system of claim 15, wherein the action comprises processing a payment.

20. The system of claim 19, wherein the accommodation station uses payment information associated with the identity to process the payment.

* * * * *